(No Model.)

C. W. LUYSTER.
ATTACHMENT FOR SHOVEL PLOWS.

No. 326,912. Patented Sept. 22, 1885.

Attest:
John A. Ellis
A. B. Moore

Inventor:
Cornelius W. Luyster
By David A. Burr
Atty.

UNITED STATES PATENT OFFICE.

CORNELIUS W. LUYSTER, OF NEWTON, NEW YORK.

ATTACHMENT FOR SHOVEL-PLOWS.

SPECIFICATION forming part of Letters Patent No. 326,912, dated September 22, 1885.

Application filed June 22, 1885. (No model.)

*To all whom it may concern:*

Be it known that I, CORNELIUS W. LUYSTER, of Newton, in the county of Queens and State of New York, have invented a new and useful Improvement in Cultivating Attachments for Plows; and I do hereby declare that the following is a full and exact description thereof, reference being had to the accompanying drawings, and to the letters of reference marked thereon, making a part of this specification.

My invention relates to an improved cultivating attachment especially adapted for use with shovel-plows; and it is designed to facilitate the use of the plow in cultivating and weeding growing crops without in any manner impairing or affecting the use of the plow for ordinary work.

Figure 1:
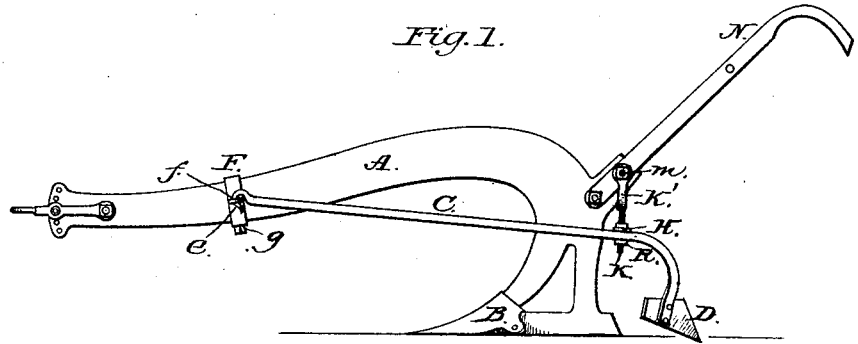
Figure 2:
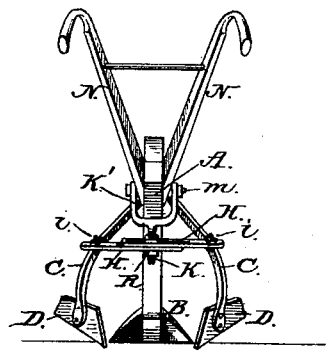
Figure 3:

In the accompanying drawings, Figure 1 is a side elevation of a shovel-plow having my cultivating attachment applied thereto; Fig. 2, a rear view of the same; and Fig. 3, a plan view of the lateral adjusting-plates, illustrating the mode of making them fast.

A is the beam, and B the share, of a shovel-plow of any approved construction, and which herein needs no further description.

C C are rods long enough to extend from near the front end of the beam A to the rear of the plowshare. The rear end of each rod is bent to a right angle (more or less) with its length, and is pierced with bolt-holes to facilitate the attachment thereto of a reversible scraping and weeding blade, D, or a cultivator-point, or such other form of tool for stirring or moving the soil as may be found desirable to use in connection with the plowshare or shovel B. The front end of each rod terminates, preferably, in a hook, e, by which it is readily attached to an eye, f, fitted to receive it upon the side of the plow-beam. The eyes for the rods are preferably formed upon an open band, F, adapted to slip over the front end of the plow-beam and to be clasped and made fast thereon by means of a transverse bolt, g, passing through the ends of the band under the beam and made fast by a nut upon the bolt.

A slotted plate or bar, H, is pivoted at one end upon the top of each rod C, near to its rear end, by means of a bolt, i. When the rods are hooked to the beam, these slotted plates H H extend therefrom inwardly and intersect under the rear end of the beam and are there supported, and when adjusted are confined by means of a bolt, K, depending from a clevis, K', which is secured to the rear end of the beam by means of one of the bolts, m, which secure the plow-handles N N to the beam. The bolt K drops through the slots in the intersecting bars H H, and serves to hold them fast by means of a nut, R, upon its threaded end.

My attachment thus consists simply of two draft-rods, C C, fitted each with a cultivating-tool at one end and adapted to hook at the other into eyes at the forward end of the plow-beam, and to which are pivoted slotted bars H H, projecting inwardly to intersect and be engaged by a central bolt, K, depending from the rear end of the plow-beam through the slots in said bars, the bars being made fast by a thumb-nut, R, on said bolt. By removing this nut R the bars are slipped off of the bolt K, and the rods C C may then be unhooked and quickly detached from the plow. The eyes f f are readily fitted to any of the customary forms of plows by means of the adjustable band F. The bolt K and clevis K' are also readily fitted to the rear end of the plow by means of one of the bolts m, holding the handle. My device is therefore cheaply made and readily applied.

In operation, the attachment being secured to the plow in manner as described, the cultivating-teeth D D are adjusted, as to their width from the plow and from each other, by means of a longitudinal movement of the bars H H upon their central retaining-bolt, K, and are then made fast by its nut R. As the plow follows the row the cultivating teeth or shares D D will scrape or loosen the soil outside of the furrow produced by the plowshare B quite close up to the growing plants in the rows, and the entire space between them will be thus thoroughly worked at one operation. As the draft upon the cultivators is directly from the front end of the plow-beam they move steadily and easily without any tendency to produce lateral displacement of the plow.

I am aware that lateral cultivating-teeth have heretofore been connected with a plowshare by means of arms attached directly to the share, and have also been secured to a transverse beam fixed to the rear end of the plow-beam, so as to depend upon said fixed transverse beam for their draft. My improvement differs therefrom in that the draft of each cultivating-tool is directly from the front end of the plow-beam without any attachment to or interference with the plowshare, and that the cultivators are detachable from the plow, and when attached admit of lateral adjustment.

I am also aware that cultivators have been constructed with expansible side bars and shares adjusted on either side of a central bar; but my improvement differs therefrom in that the bars in these cultivators are all united and permanently attached together in one device, and that, were the expanding side bars detached, the center bar would in itself be useless, whereas in my invention the side bars are auxiliaries to a plow which is in itself complete as a plow, but which by the attachment of the removable side bars and shares becomes serviceable as a cultivator; and my improvement consists, mainly, in rendering the plow thus serviceable as a cultivating implement, without detracting from its use otherwise as a plow, by means of attachments constructed and applied in manner as described.

I claim as my invention—

The combination, with the beam A of a plow and its share B, of the detachable band F, fitted upon the forward end of said beam and provided with eyes $f f$, the detachable rods C C, hooking into the said eyes and fitted at their rear ends with detachable blades or shares D D, the transverse slotted bars H H, pivoted to said rods above the blades, to project thence inwardly and intersect beneath the rear end of the beam A, a bolt, K, depending from said beam through the intersecting slots, and a nut screwing upon the bolt to bind and secure the bars, all substantially in the manner and for the purpose herein set forth.

In testimony whereof I have signed my name to this specification in the presence of two subscribing witnesses.

CORNELIUS W. LUYSTER.

Witnesses:
J. F. ACKER, Jr.,
A. B. MOORE.